(12) United States Patent
Anderson et al.

(10) Patent No.: US 9,111,046 B2
(45) Date of Patent: Aug. 18, 2015

(54) IMPLEMENTING CAPACITY AND USER-BASED RESOURCE ALLOCATION FOR A SHARED ADAPTER IN A VIRTUALIZED SYSTEM

(71) Applicant: International Business Machines Corporation, Armonk, NY (US)

(72) Inventors: Gary D. Anderson, Austin, TX (US); Charles S. Graham, Rochester, MN (US); John R. Oberly, III, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/915,903

(22) Filed: Jun. 12, 2013

(65) Prior Publication Data
US 2014/0372638 A1 Dec. 18, 2014

(51) Int. Cl.
*G06F 3/00* (2006.01)
*G06F 13/38* (2006.01)

(52) U.S. Cl.
CPC .................. *G06F 13/387* (2013.01)

(58) Field of Classification Search
CPC ... G06F 13/385; G06F 13/038; G06F 13/387; G06F 1/1632; G06F 3/023
USPC .......................... 710/16, 18, 19, 62
See application file for complete search history.

(56) References Cited

U.S. PATENT DOCUMENTS

| | | | |
|---|---|---|---|
| 5,875,310 A | 2/1999 | Buckland et al. | |
| 6,122,289 A | 9/2000 | Brown et al. | |
| 6,311,326 B1 | 10/2001 | Shagam | |
| 7,231,493 B2 | 6/2007 | Nguyen et al. | |
| 7,757,129 B2 | 7/2010 | Bohizic et al. | |
| 7,770,073 B2 | 8/2010 | Fashchik et al. | |
| 8,141,092 B2 | 3/2012 | Brown et al. | |
| 8,261,242 B2 | 9/2012 | Booth et al. | |
| 8,358,661 B2 | 1/2013 | Armstrong et al. | |
| 8,359,415 B2 | 1/2013 | Brown et al. | |
| 8,375,363 B2 | 2/2013 | Zhou et al. | |
| 8,418,166 B2 | 4/2013 | Armstrong et al. | |
| 8,447,891 B2 | 5/2013 | Brownlow et al. | |

(Continued)

FOREIGN PATENT DOCUMENTS

EP 1130501 A1 9/2001

OTHER PUBLICATIONS

Bhosale, Shivaji D. et al., "IBM Power Systems SR-IOV Technical Overview and Introduction", REDP-5065-00, International Business Machines Corporation, May 20, 2014, pp. 1-71.

(Continued)

*Primary Examiner* — Farley Abad
(74) *Attorney, Agent, or Firm* — Joan Pennington

(57) ABSTRACT

A method, system and computer program product are provided for implementing capacity and user-based resource allocation for a hardware I/O adapter, such as, a Single Root Input/Output Virtualization (SRIOV) adapter in a virtualized system. Configuring a virtual function (VF) is provided by supplying a capacity value of a port. The capacity value represents a percentage of the available performance of the port. The adapter driver configures multiple adapter parameters to provide the available performance for the port. A user is enabled to specify a level of performance assigned to each protocol of the port.

17 Claims, 13 Drawing Sheets

(56) References Cited

U.S. PATENT DOCUMENTS

| | | |
|---|---|---|
| 2002/0161907 A1 | 10/2002 | Moon |
| 2003/0037275 A1 | 2/2003 | Bakke et al. |
| 2008/0147904 A1 | 6/2008 | Freimuth et al. |
| 2010/0115049 A1 | 5/2010 | Matsunaga et al. |
| 2011/0040860 A1 | 2/2011 | DeCusatis et al. |
| 2012/0137288 A1 | 5/2012 | Barrett et al. |
| 2012/0151472 A1 | 6/2012 | Koch et al. |
| 2012/0179932 A1 | 7/2012 | Armstrong et al. |
| 2012/0180047 A1 | 7/2012 | Cardona et al. |
| 2012/0180048 A1 | 7/2012 | Brownlow et al. |
| 2012/0185632 A1 | 7/2012 | Lais et al. |
| 2012/0297379 A1 | 11/2012 | Anderson et al. |
| 2012/0317548 A1 | 12/2012 | Olsa et al. |
| 2013/0054507 A1 | 2/2013 | Das et al. |

OTHER PUBLICATIONS

Ko, Mike et al., "Virtual Ethernet Bridging", International Business Machines Corporation, Jul. 2008, pp. 1-11.

Power 7 Information, Virtualizing Power Systems Servers, International Business Machines Corporation, Apr. 29, 2014.

Emulex, "Single Root I/O Virtualization (SR-IOV)", Version 3.1 User's Guide, P007978-01A Rev. A, 2012, pp. 1-5.

Varma, Anujan, "Single Root IOV Endpoint Implementation", PCI-SIG Developers Conference 2007, PCI-SIG, May 21, 2007, pp. 1-36.

International Search Report and Written Opinion of the ISA dated Jul. 8, 2014—International Application No. PCT/JP2014/002914.

Netronome; "Standardized but Flexible I/O for Self-Virtualizing Devices"; WTOV'08 Proceedings of the First Conference on I/O Virtualization; p. 9-9; 2008.

Broadcom; "Broadcom Ethernet Network Controller Enhanced Virtualization Functionality"; http://www.broadcom.com/press/release.php?id=1197764; White Paper; Oct. 2009.

Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.

Charles S. Graham et al. U.S. Appl. No. 13/915,887, filed on the same day herewith, entitled "Implementing Distributed Debug Data Collection and Analysis for a Shared Adapter in a Virtualized System", Jun. 12, 2013.

Charles S. Graham et al. U.S. Appl. No. 13/915,737, filed on the same day herewith, entilted "Implementing Concurrent Device Driver Maintenance and Recovery for an SRIOV Adapter in a Virtualized System", Jun. 12, 2013.

Jesse P. Arroyo et al. U.S. Appl. No. 13/915,943, filed on the same day herewith, entitled "Implementing Enhanced Error Handling of a Shared Adapter in a Virtualized System", Jun. 12, 2013.

Charles S. Graham et al. U.S. Appl. No. 13/915,966, filed on the same day herewith, entitled "Implementing Shared Adapter Configuration Updates Concurrent With Maintenance Actions in a Virtualized System", Jun. 12, 2013.

Jesse P. Arroyo et al. U.S. Appl. No. 13/916,005, filed on the same day herewith, entitled "Implementing Concurrent Adapter Firmware Update of an SRIOV Adapter in a Virtualized System", Jun. 12, 2013.

Kirk Glerum et al., "Debugging in the (Very) Large: Ten Years of Implementation and Experience", Microsoft Corporation, 2009.

Nithya Ramanathan et al., "Sympathy for the Sensor Network Debugger", UCLA Center for Embedded Network Sensing, 2005.

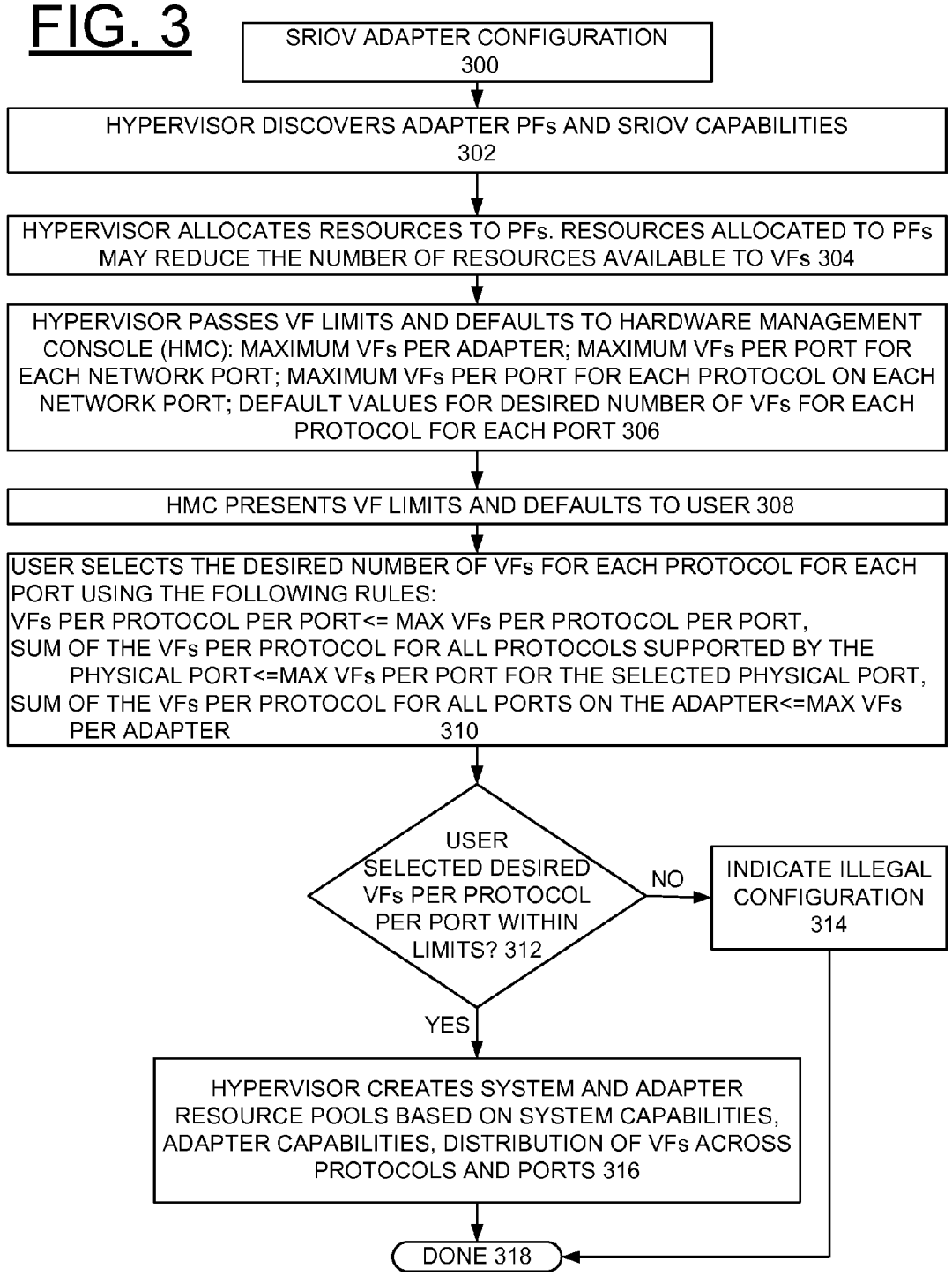

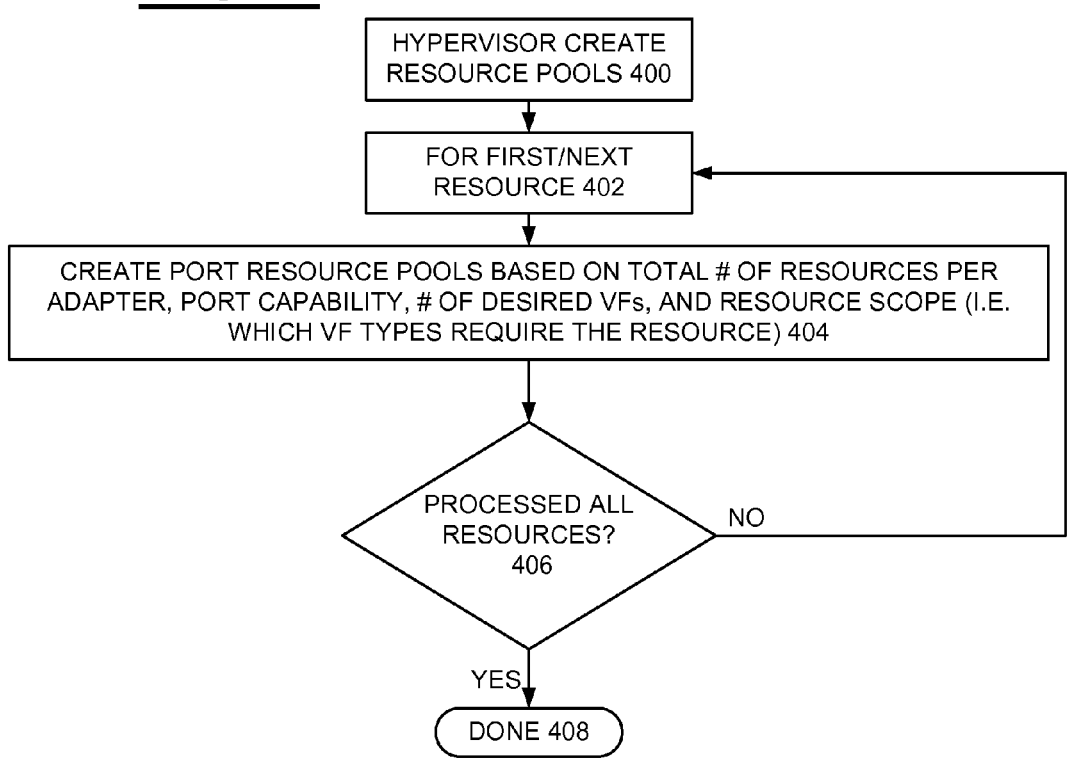

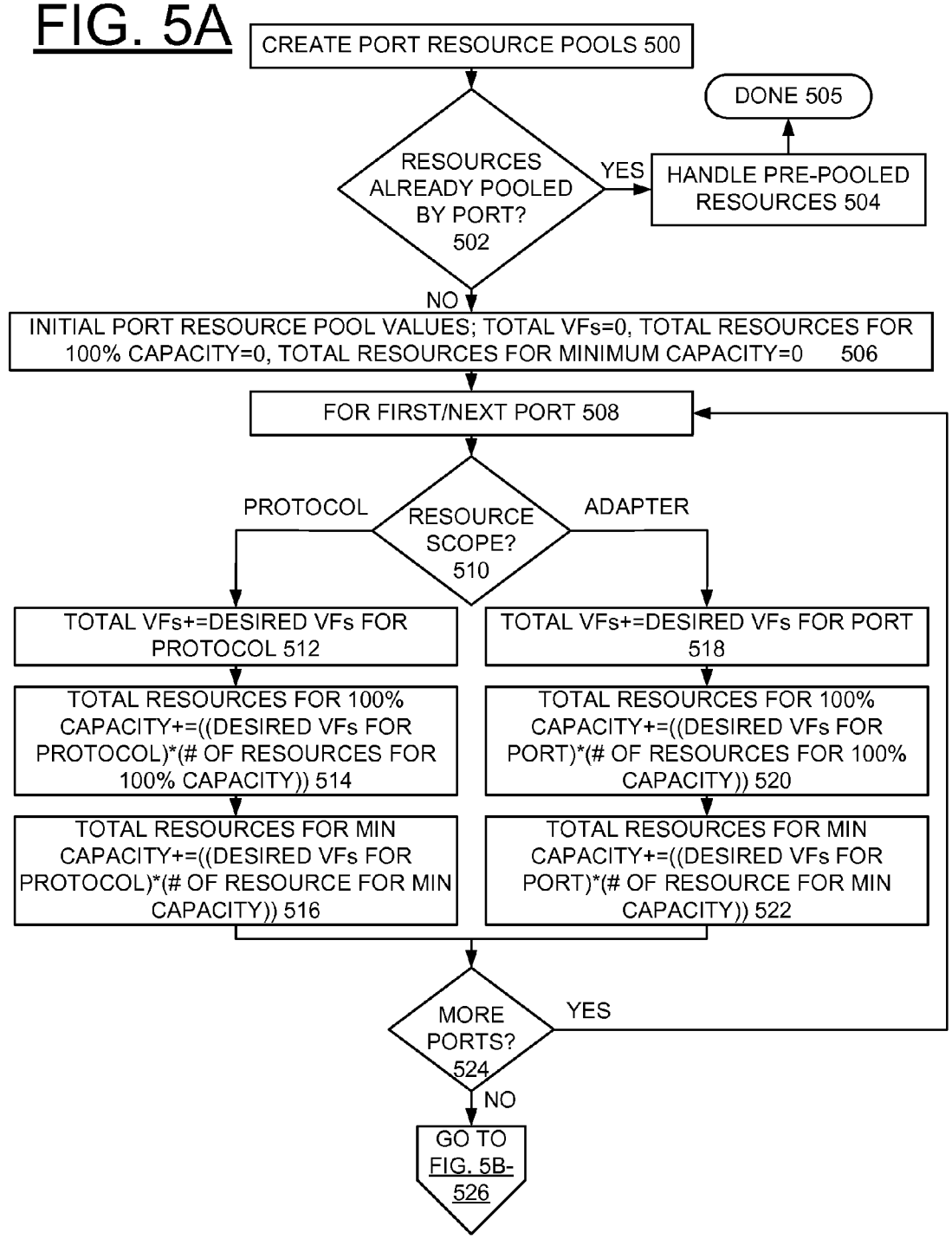

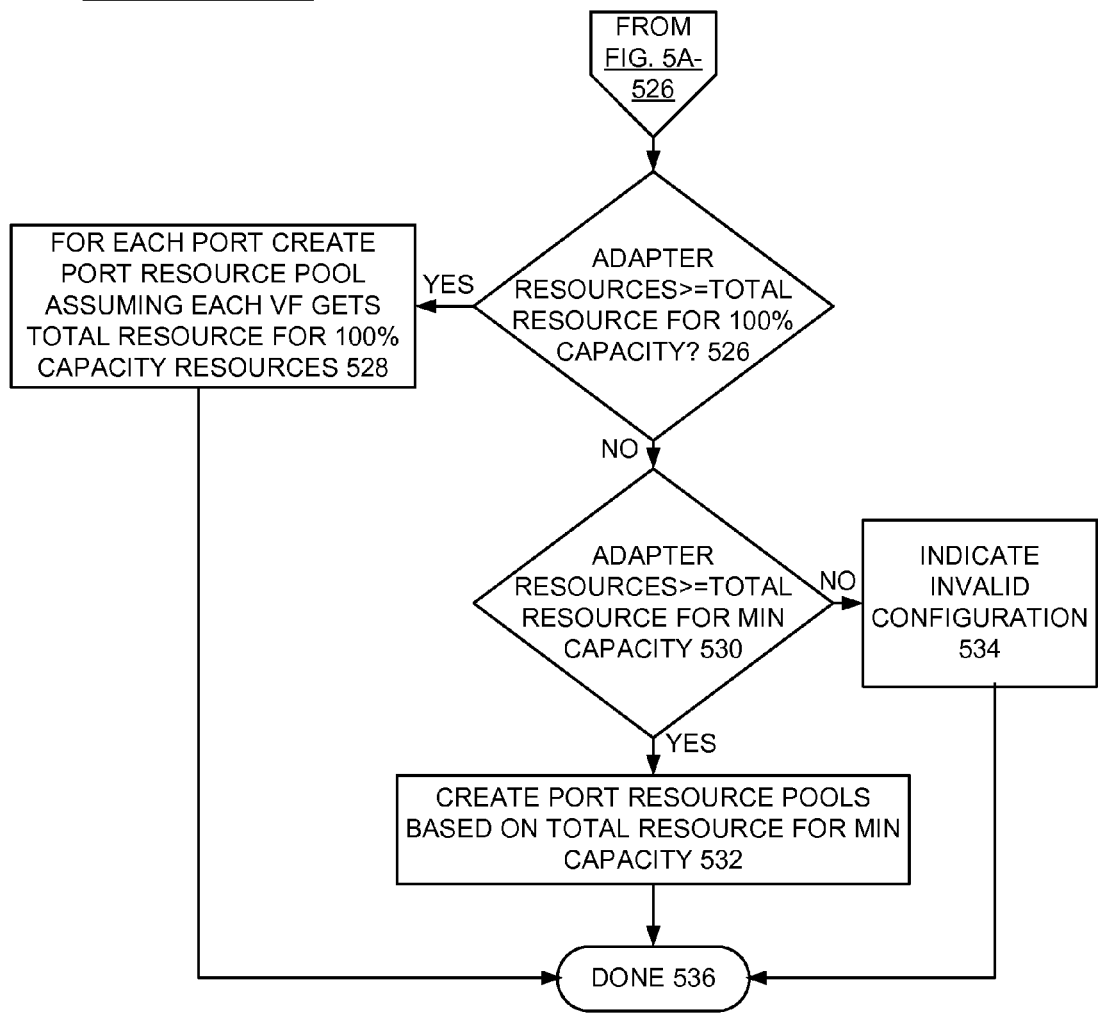

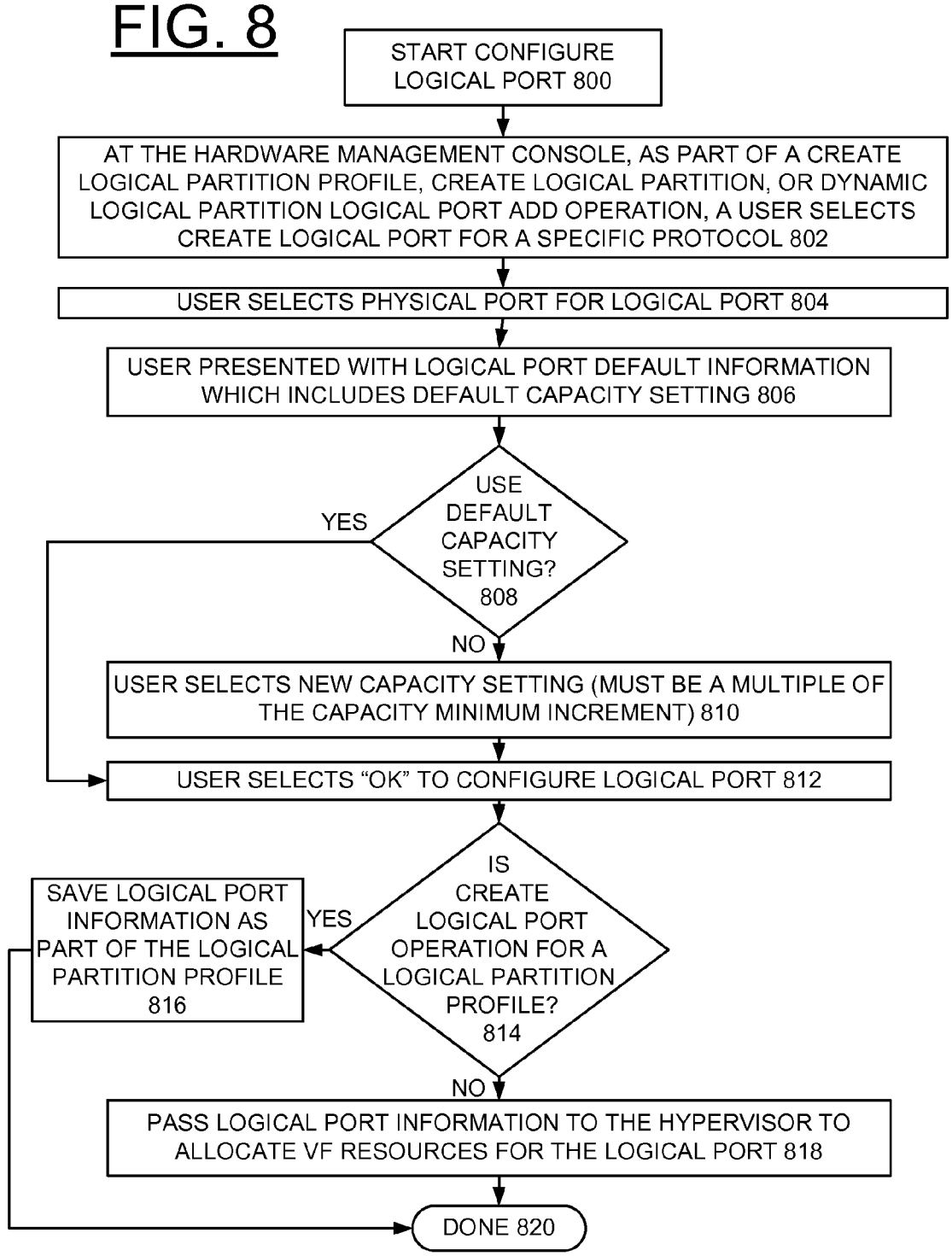

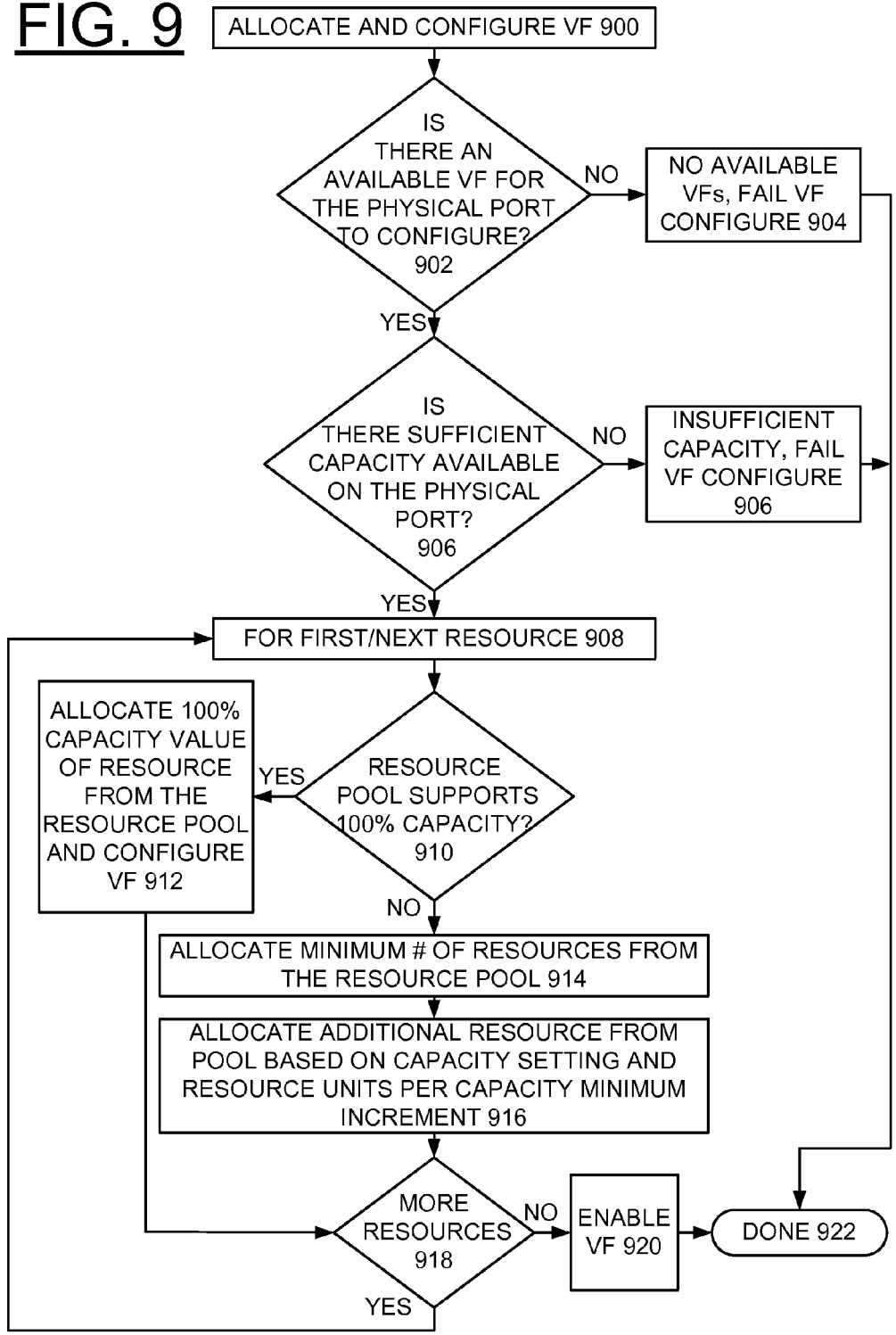

ADAPTER INFORMATION 1000

| SCOPE | PORTOCOLS | MAX VFs | CAPACITY MINIMUM INCREMENT |
|---|---|---|---|
| ADAPTER | | REQUIRED | |
| PORT 1 | | REQUIRED | |
| | PROTOCOL A | REQUIRED | REQUIRED |
| | PROTOCOL B | REQUIRED | REQUIRED |
| PORT 2 | | REQUIRED | |
| | PROTOCOL A | REQUIRED | REQUIRED |
| | PROTOCOL C | REQUIRED | REQUIRED |
| PORT N | | REQUIRED | |
| | PROTOCOL N | REQUIRED | REQUIRED |

FIG. 10A

ADAPTER RESOURCE TABLE 1002

| RESOURCE | PROTOCOLS | RESOURCE SCOPE | # OF RESOURCE PER ALLOCATION UNIT |
|---|---|---|---|
| TYPE 1 | | | |
| TYPE 2 | | | |
| * | | | |
| TYPE N | | | |

FIG. 10B

RESOURCE TYPE 1 1004

| PORT # | MINIMUM # OF RESOURCES PER VF | # OF RESOURCE FOR 100% CAPACITY | AVAILABLE RESOURCES |
|---|---|---|---|
| 1 | | | |
| 2 | | | |
| * | | | |
| N | | | |

FIG. 10C

RESOURCE TYPE N 1006

| PORT # | MINIMUM # OF RESOURCES PER VF | # OF RESOURCE FOR 100% CAPACITY | AVAILABLE RESOURCES |
|---|---|---|---|
| 1 | | | |
| 2 | | | |
| * | | | |
| N | | | |

FIG. 10D

IMPLEMENTING CAPACITY AND USER-BASED RESOURCE ALLOCATION FOR A SHARED ADAPTER IN A VIRTUALIZED SYSTEM

FIELD OF THE INVENTION

The present invention relates generally to the data processing field, and more particularly, relates to a method, system and computer program product for implementing capacity and user-based resource allocation for a hardware I/O adapter, such as a Single Root Input/Output Virtualization (SRIOV) adapter, in a virtualized system.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel (FC), Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

A need exists to provide the ability to differentiate the service level among the various VFs. Many known SRIOV arrangements do not allow the customer to differentiate the VFs even though the VFs might be used for very different applications. Some prior arrangements have not provided any differentiation; that is, no service guarantees of any sort are provided. Performance can be unpredictable, and partitions which are very active can hog the available bandwidth. Both the Host Ethernet Adapter (HEA) and the Virtual I/O Server (VIOS) are examples of this type of arrangement.

Some other arrangements enable static resource allocation, for example dividing the available resources, and performance, equally among the VFs; however, this does not allow the customer to differentiate the VFs even though they might be used for very different applications.

A need exists for an effective mechanism to enable capacity and user-based resource allocation for a hardware I/O adapter or a Single Root Input/Output Virtualization (SRIOV) adapter in a virtualized system.

SUMMARY OF THE INVENTION

Principal aspects of the present invention are to provide a method, system and computer program product for implementing capacity and user-based resource allocation for a hardware I/O adapter, such as a Single Root Input/Output Virtualization (SRIOV) adapter, in a virtualized system. Other important aspects of the present invention are to provide such method, system and computer program product substantially without negative effects and that overcome many of the disadvantages of prior art arrangements.

In brief, a method, system and computer program product are provided for implementing capacity and user-based resource allocation for a hardware I/O adapter, such as a Single Root Input/Output Virtualization (SRIOV) adapter, in a virtualized system. Configuring a virtual function (VF) is provided by supplying a capacity value of a port. The capacity value represents a percentage of the available performance of the port. The adapter driver configures multiple adapter parameters to provide the available performance for the port. A user is enabled to specify a level of performance assigned to each protocol of the port.

In accordance with features of the invention, a system administrator effectively configures the virtual function (VF), supplying the capacity value for the port. The capacity value indicates a level of adapter resources. Additionally, the capacity value may specify system or platform resources, for example, including DMA space, interrupts, and the like.

In accordance with features of the invention, the user interface enables a user to do a simple configuration of the VFs on the port. The user interface can be used for many different adapters, providing a generic approach for the user. The user interface allows for a maximum fanout case, that is maximum VFs. This also allows for a fewer number of VFs to be specified; each having a commensurately larger share of the available resource. Because the adapter driver is aware of the total capacity assigned, no resources need to be held in reserve for additional VFs because all of the port capacity has been assigned.

In accordance with features of the invention, a per protocol, per port capacity minimum increment and a per protocol, per port base capacity minimum increment are provided. These increment values are specific to a given protocol on a given port of a given adapter. The specific values are determined by the adapter device driver, and communicated to a hardware management console (HMC) for customer usage. Different adapters can have different values, for example based upon different underlying adapter hardware resource requirements. Similarly, different physical ports may have different values.

In accordance with features of the invention, VF configuration requests then are allowed if the VF configuration requests are both at least a minimum capacity, and a valid capacity defined by a base capacity combined with a pre-defined capacity increment. This enables the adapter driver to perform block allocation of adapter resources. Block allocation of adapter resources may be required by a particular adapter design. The capacity minimum increment also communicates relative adapter resource and port bandwidth usage between VFs of different protocols sharing the same physical port.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3, 4, 5A, 5B, 6, 7, 8, and 9 are flow charts illustrating exemplary operations for implementing capacity and user-based resource allocation for the SRIOV adapter in accordance with the preferred embodiment;

FIGS. 10A, 10B, 10C, and 10D are diagrams respectively illustrating example adapter information, adapter resource table, resource type 1, and resource type N for implementing capacity and user-based resource allocation for the SRIOV adapter in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing capacity and user-based resource allocation for a shared hardware I/O adapter, such as a Single Root Input/Output Virtualization (SRIOV) adapter, in a virtualized system.

Figure 1:
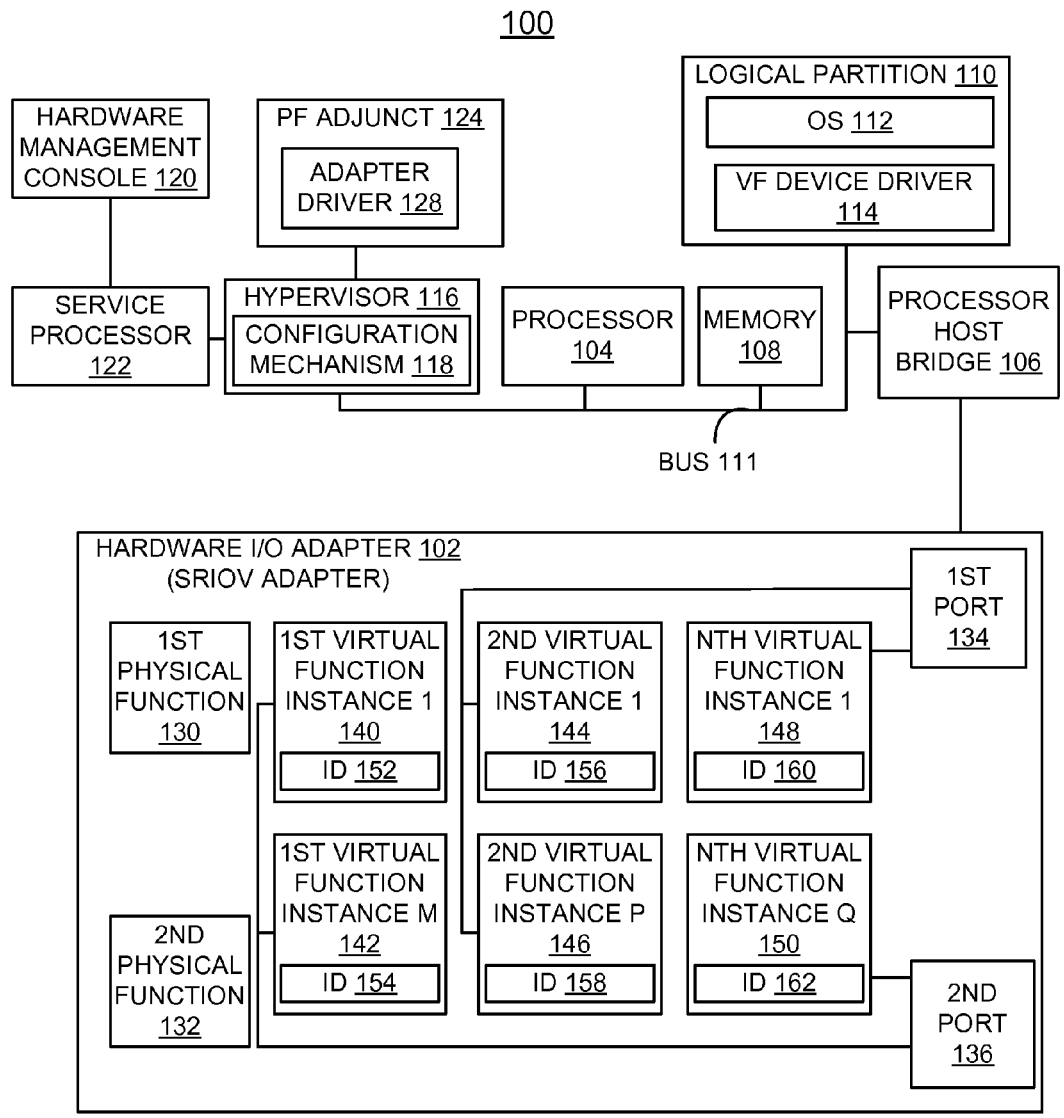
FIGS. 1, and 2 illustrates a respective example computer system and example system for implementing capacity and user-based resource allocation for a hardware I/O adapter, such as, a Single Root Input/Output Virtualization (SRIOV) adapter in accordance with the preferred embodiment.

Having reference now to the drawings, in FIG. 1, there is shown an example computer system generally designated by the reference character 100 for implementing capacity and user-based resource allocation for a hardware I/O adapter or Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR 110 allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based upon configuration information provided by a system administrator via the hardware management console 120. The hypervisor 116 uses the adapter driver 128 to configure various adapter parameters, providing capacity and user-based resource allocation based upon a single capacity value provided by a system administrator via the hardware management console 120 in accordance with the preferred embodiment.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
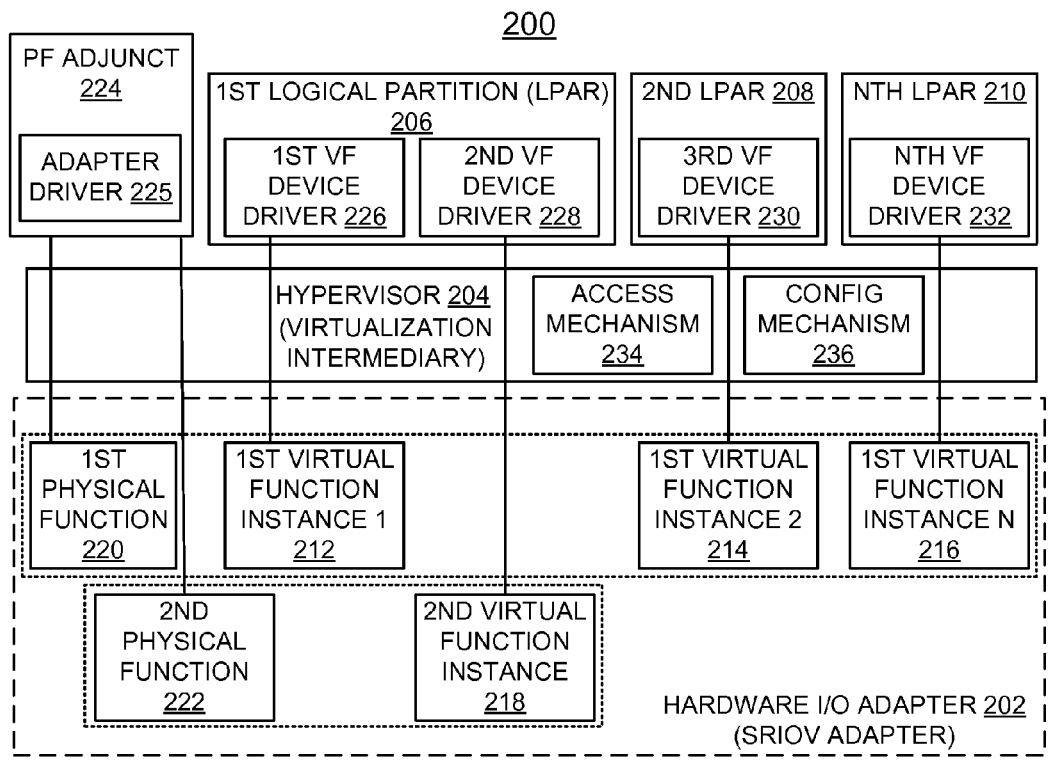

Referring to FIG. 2, there is shown another example system generally designated by the reference character 200 for implementing capacity and user-based resource allocation for a hardware I/O adapter or Single Root Input/Output Virtualization (SRIOV) adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 204, 206, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 304 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, a system administrator configures the VF by supplying a single capacity value. The capacity setting indicates a level of adapter resources. Additionally, it may specify system or platform resources. These might include DMA space, interrupts, and the like. This value represents a percentage of the available performance of the port. The adapter driver then configures the various adapter parameters to accomplish this behavior. The interface exposed to the user is to specify a single capacity value, which reflects the resources assigned to a given VF. This value is intended to be a fraction, or more specifically, percentage of the overall capacity of the physical port. The user then is able to do simple configuration of the VFs on the port. This allows for a maximum fanout case, that is maximum VFs. It also allows for a fewer number of VFs to be specified, with each having a commensurately larger share of the available resource. One advantage here is that all adapter resources can be used even with a smaller number of VFs. Because the adapter device driver is aware of the total capacity assigned, no resources need to be held in reserve for additional VFs because all of the port capacity has been assigned.

In accordance with features of the invention, advantages provided by the invention include differentiation on a VF by VF basis; a simple user interface; and an approach is consistent across different protocol types, such as Network Interface Controller (NIC), Fibre Channel (FC), and Fibre Channel over Ethernet (FCoE). Also the same interface can be used for many different adapters, that is, a generic approach for the customer. However, the underlying implementation may be specific to a given adapter or adapter vendor. A user is able to specify the level of performance assigned to each protocol. Converged Enhanced Ethernet (CEE) ports supporting both NIC and FCoE, can have varying levels of performance assigned to each of the protocols, for example all NIC, all FCoE, or varying levels in between. Multiple usage modes including fixed allocation, uncapped allocation, and banded or capped allocation are supported and can be applied on a VF by VF basis, and different VFs may have different approaches concurrently on the same physical port.

In accordance with features of the invention, the interface includes a per protocol, per port capacity minimum increment and also a per protocol, per port base capacity minimum. VF configuration requests then are only allowed if they are both at least the minimum, and also a valid capacity (base capacity+NN*capacity increment). This enables the adapter driver to perform block allocation of adapter resources. Block allocation of adapter resources may be required by a particular adapter design. The capacity minimum increment also communicates relative adapter resource and port bandwidth usage between VFs of different protocols sharing the same physical port. These increment values are specific to a given protocol on a given port of a given adapter. The specific values are determined by the adapter driver, and communicated to the HMC for customer usage. Different adapters can have different values, for example based upon different underlying adapter hardware resource requirements. Similarly, different physical ports might have different values. One example might be an Ethernet adapter which has a mixture of 1 G and 10 G ports. Different protocols might vary also; the resource groupings between a FCoE VF and a NIC VF may be very different, and require a different capacity increment. Forcing them to the same value would require subpar allocation for one of the protocol types. This also allows for easy allocation of resources between protocols on the same physical port. The customer has a single number to use reflecting the relative capacity on this port. This simplifies the configuration of Converged Enhanced Ethernet (CEE).

In accordance with features of the invention, a capacity allocation scheme includes a guaranteed level of resources available to the VF. This invention accommodates several different approaches for any leftover capacity on the port. These approaches are applied on a VF by VF basis, and different VFs may have different approaches concurrently on the same physical port that include fixed allocation, uncapped allocation, and banded or capped allocation. Fixed allocation specifies that both the minimum and maximum performance should be the same. For example, a capacity setting of 20% indicates that 20% of the resources of the port, such as bandwidth, are set aside for this VF, and also that this VF is not allowed to use more than 20% of the port. Uncapped allocation specifies a minimum capacity, but no maximum. For example, a capacity setting of 20% indicates that 20% of the resources of the port, such as bandwidth, are set aside for this VF, and this VF is allowed to use any unassigned capacity or assigned but underutilized capacity, up to 100% of the physical port. Banded or capped allocation specifies both a minimum and maximum capacity. In this case the user supplies two capacity values, a minimum and a maximum. For example, capacity settings of (20%, 60%) indicates that 20% of the resources of the port, such as bandwidth, are set aside for this VF, and also that this VF is allowed to use up to 60% of the physical port. An uncapped allocation of X % is of course equivalent to a banded allocation of (X %, 100%).

Referring to FIGS. 3, 4, 5A, 5B, 6, 7, 8, and 9, there are shown exemplary operations for implementing capacity and user-based resource allocation for the SRIOV adapter in accordance with the preferred embodiment.

In FIG. 3, as indicated in a block 300, the operations begin with SRIOV adapter configuration. The hypervisor discovers adapter PFs and SRIOV capabilities as indicated in a block 302. The hypervisor allocates resources to adapter PFs, where resources allocated to PFs may reduce the number of resources available to VFs as indicated in a block 304. The hypervisor passes VF limits and defaults to the hardware management console including maximum VFs per adapter; maximum VFs per port for each network port; maximum VFs per port for each protocol on each network port; and default values for desired number of VFs for each protocol for each port as indicated in a block 306. The hardware management console presents VF limits and defaults to a user as indicated in a block 308. Next users selections are received with the user selecting the desired number of VFs for each protocol for each port using set rules as indicated in a block 310. At block 310, the user selects the desired number of VFs for each protocol for each port with the VFs per protocol per port are less than or equal to the maximum VFs per protocol per port; a sum of the VFs per protocol for all protocols supported by the physical port are less than or equal to the maximum VFs per port for the selected physical port; and a sum of the VFs per protocol for all ports on the adapter are less than or equal to the maximum VFs per adapter. Checking whether the user selected desired VFs per protocol per port within limits is performed as indicated in a decision block 312. If the user selected desired VFs per protocol per port are not within limits, then the configuration is indicated as an illegal configuration as indicated in a block 314. If the user selected desired VFs per protocol per port are within limits, then the hypervisor creates system and adapter resource pools based upon system capabilities, adapter capabilities, distribution of VFs across protocols and ports as indicated in a block 316, as further illustrated and described with respect to FIG. 4. The operations are complete as indicated in a block 318.

In FIG. 4, as indicated in a block 400, the hypervisor creates resource pools. Then as indicated in a block 402 for a first/next resource, the hypervisor creates resource pools based upon a total number of resources per adapter, port capability, number of desired VFs, and resource scope, that is which VF types require the resource, as indicated in a block 402, as further illustrated and described with respect to FIGS. 5A, 5B. Checking for all resources having been processed is performed as indicated in a decision block 406. When all resources have been processed, the operations are complete as indicated in a block 408.

In FIGS. 5A, and 5B, as indicated in a block 500, port resource pools are created. Checking whether all resources are already pooled by port is performed as indicated in a decision block 502. When all resources are already pooled by port, then the pre-pooled resources are handled as indicated in a block 504, and the operations are complete as indicated in a block 505. Otherwise initial port resource pool values are set, setting total VFs equal to zero, total resources for 100% capacity equal zero and total resources for minimum capacity equal zero as indicated in a block 506. Then as indicated in a block 508 for a first/next port, the hypervisor checks a resource scope as indicated in a decision block 510 where protocol and adapter are example scopes, there may be other scopes as well. For example, resources may be tied to a specific port. In this case the resource scope would be a port.

For protocol scope total VF is updated by adding the total VF and desired VFs for protocol as indicated in a block 512, as shown by Total VF+=Desired VFs for protocol. Next as indicated in a block 514, the Total Resources for 100% capacity+=(Desired VFs for protocol)*(# of resource for 100% capacity), for example from adapter information and adapter resource table as shown in FIGS. 10A, 10B, 10C, 10D. Then as indicated in a block 516, Total Resources for minimum capacity+=(Desired VFs for protocol)*(# of resource for minimum capacity).

For adapter scope total VF is updated by adding the total VF and desired VFs for port as indicated in a block 518, as shown by Total VF+=Desired VFs for port. Next as indicated in a block 520, the Total Resources for 100% capacity+=(Desired VFs for port)*(# of resource for 100% capacity), for example from adapter information and adapter resource table as shown in FIGS. 10A, 10B, 10C, 10D. Then as indicated in a block 522, Total Resources for minimum capacity+=Desired VFs for port)*(# of resource for minimum capacity).

Checking whether all ports have been processed is performed as indicated in a decision block 524. When all ports have not been processed, then the operations go to block 508 for the next port and continue. When all ports have been processed, then the operations go to block 526 in FIG. 5B.

Figure 6:
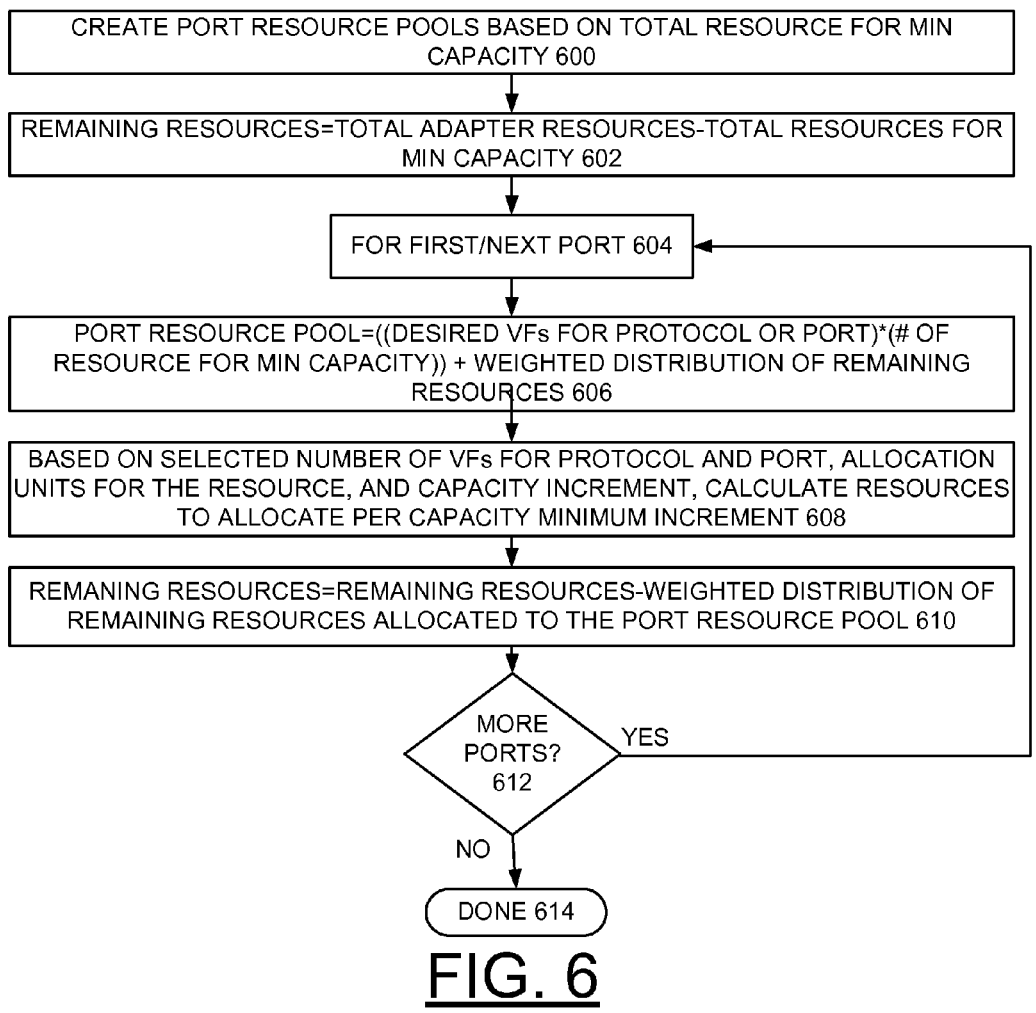

In FIG. 5B, checking whether the adapter resources>=Total Resource for 100% capacity is performed as indicated in a decision block 526. When the adapter resources are greater than or equal to the total resource for 100% capacity, then create for each port resource pool assuming each VF gets Total Resources for 100% capacity resources as indicated in a block 528. When the adapter resources are not greater than or equal to the total resource for 100% capacity, then checking whether the Adapter resource capacity>=Total resource for minimum capacity is performed as indicated in a decision block 530. When the Adapter resource capacity is greater than or equal to Total resource for minimum capacity then port resource pools are created based on total resource for minimum capacity as indicated in a block 532, such as illustrated in FIG. 6. When the Adapter resource capacity is not greater than or equal to Total resource for minimum capacity then an invalid configuration is indicated as indicated in a block 534. The operations are complete as indicated in a block 536.

In FIG. 6, port resource pools are created based on Total resource for minimum capacity as indicated in a block 600. As indicated in a block 602, remaining resources are calculated as shown, Remaining resources=Total adapter resources−Total Resources for min capacity. Then as indicated in a block 604 for a first/next port, the port resource pool is calculated as shown, Port resource pool=((Desired VFs for protocol or port)*(# of resource for min capacity))+a weighted (based on port capability) distribution of Remaining resources. Then as indicated in a block 608, based on selected number of VFs for protocol and port, allocation units for the resource, and Capacity Increment, resources to allocate per Capacity Minimum Increment are calculated. As indicated in a block 610, remaining resources are calculated as shown, Remaining resources=Remaining resources–weighted distribution of Remaining resources allocated to the port resource pool. Checking whether all ports have been processed is performed as indicated in a decision block 612. When all ports have not been processed, then the operations go to block 604 for the next port and continue. When all ports have been processed, then the operations are complete as indicated in a block 614.

Figure 7:
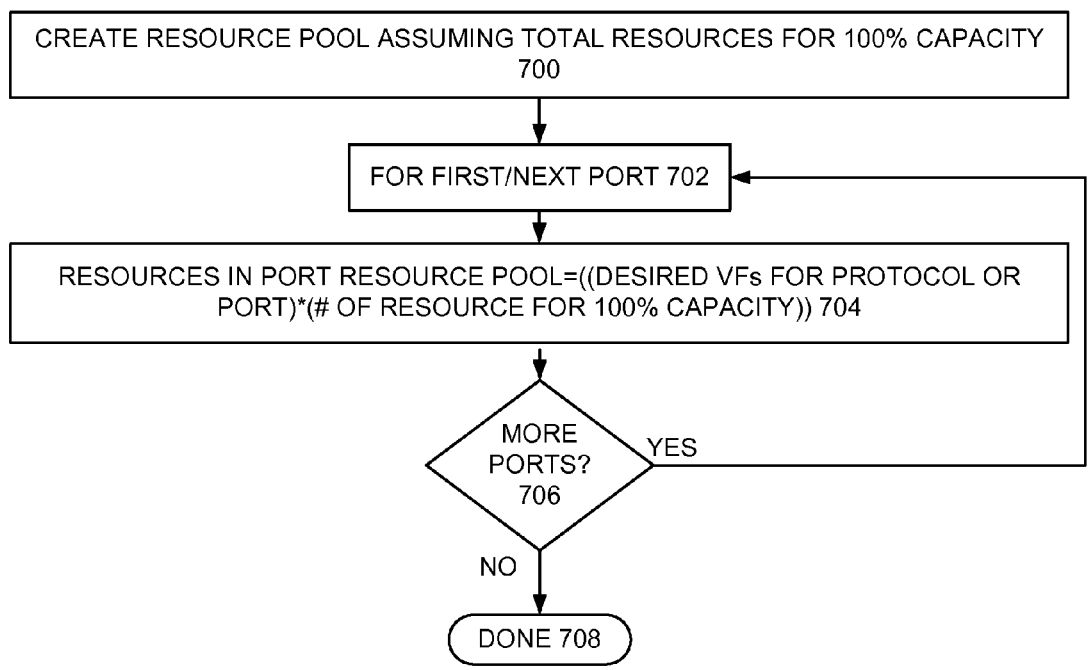

In FIG. 7, port resource pools are created based on Total resource for 100% capacity as indicated in a block 700. Then as indicated in a block 702 for a first/next port, the port resource pool is calculated as shown, Resources in port resource pool=(Desired VFs for protocol or port)*(# of resource for 100% capacity). Checking whether all ports have been processed is performed as indicated in a decision block 706. When all ports have not been processed, then the operations go to block 702 for the next port and continue. When all ports have been processed, then the operations are complete as indicated in a block 708.

In FIG. 8, configuring a logical port starts as indicated in a block 800. At the Hardware Management Console, as part of a create logical partition profile, creating a logical partition, or dynamic logical partition logical port add operation, a user selects create Logical Port for a specific protocol, as indicated in a block 802. The user selects a physical port for logical port as indicated in a block 804. Next the user is presented with logical port default information which includes default capacity setting, as indicated in a block 806. Checking whether for use of a default capacity setting is performed as indicated in a decision block 808. If the default capacity setting is not used, the user selects a new capacity setting as indicated in a block 810. If the default capacity setting is used, the user selects OK to configure the logical port as indicated in a block 812. Checking whether to create logical port operation for a logical partition profile is performed as indicated in a decision block 814. When create logical port operation for a logical partition profile is identified, then Logical Port information is saved as part of the logical partition profile as indicated in a block 816. Otherwise, logical port information is passed to the Hypervisor to allocate VF resources for the logical port as indicated in a block 818, as shown in FIG. 9. Then the operations are complete as indicated in a block 820.

In FIG. 9, the VF resources are allocated and configured as indicated in a block 900. Checking whether there is an available VF for the physical port to configure is performed as indicated in a decision block 902. When there is no available VF for the physical port to configure, then the VF configure fails as indicated in a block 904. When there is an available VF for the physical port to configure, then checking whether there is sufficient Capacity available on the physical port, that is, the sum of Capacity for the physical port's VFs plus the Capacity of the new VF will not exceed the max allowed for the physical port, for example 100%, as indicated in a decision block 906. Then as indicated in a block 908 for a first/next resource, the hypervisor checks if the resource pool supports 100% capacity as indicated in a decision block 910. When the resource pool supports 100% capacity, then 100% capacity value of resource is allocated from the resource pool and the VF is configured as indicated in a block 912. When the resource pool does not supports 100% capacity, a minimum number of resources from the resource pool is allocated as indicated in a block 914. Additional resource from the resource pool is allocated based upon capacity setting and resource units per capacity minimum increment as indicated in a block 916. Checking for more resources is performed as indicated in a decision block 918. When more resources are identified, then the operations go to block 908 for the next resource and continue. When all resources have been processed, then the VF is enabled as indicated in a block 920, and the operations are complete as indicated in a block 922.

FIGS. 10A, 10B, 10C, and 10D are diagrams respectively illustrating example adapter information, adapter resource table, resource type 1, and resource type N for implementing capacity and user-based resource allocation for the SRIOV adapter in accordance with the preferred embodiment.

In FIG. 10A, adapter information generally designated by reference character 1000 includes Scope of Adapter and Ports 1-N; Protocols, each including maximum VFs and Capacity minimum.

In FIG. 10B, adapter resource table generally designated by reference character 1002 includes Resource of Types 1-N, each including Protocols, Resource scope, and number # of resource per allocation unit.

In FIG. 10C, resource type 1 generally designated by reference character 1004 includes port number #, 1-N, minimum # of resources per VF, # of resource for 100% capacity, and available resources.

In FIG. 10D, resource type N generally designated by reference character 1006 similarly includes port number #, 1-N, minimum # of resources per VF, # of resource for 100% capacity, and available resources.

Figure 11:
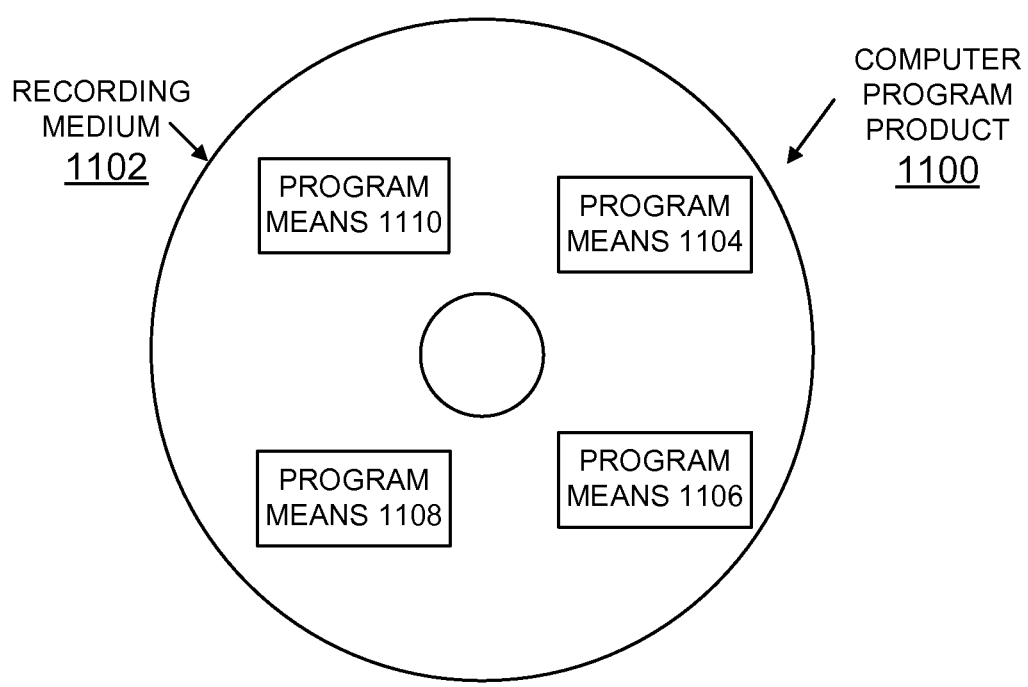
FIG. 11 is a block diagram illustrating a computer program product in accordance with the preferred embodiment.

Referring now to FIG. 11, an article of manufacture or a computer program product 1100 of the invention is illustrated. The computer program product 1100 is tangibly embodied on a non-transitory computer readable storage medium that includes a recording medium 1102, such as, a floppy disk, a high capacity read only memory in the form of an optically read compact disk or CD-ROM, a tape, or another similar computer program product. Recording medium 1102 stores program means 1104, 1106, 1108, and 1110 on the medium 1102 for carrying out the methods for implementing capacity and user-based resource allocation for an I/O adapter, such as a Single Root Input/Output Virtualization (SRIOV) adapter of a preferred embodiment, in the system 100 of FIG. 1, or system 200 of FIG. 2.

A sequence of program instructions or a logical assembly of one or more interrelated modules defined by the recorded program means 1104, 1106, 1108, and 1110, direct the computer system 1100 for implementing capacity and user-based resource allocation for the I/O adapter.

While the present invention has been described with reference to the details of the embodiments of the invention shown in the drawing, these details are not intended to limit the scope of the invention as claimed in the appended claims.

What is claimed is:

1. A method for implementing capacity and user-based resource allocation for an input/output (I/O) adapter in a virtualized computer system comprising:

configuring a virtual function (VF) using a capacity value of a port; said capacity value representing a percentage of the available performance of the port;

providing an adapter driver for configuring multiple adapter parameters to provide the available performance for the port; and enabling a user to specify a level of performance assigned to each protocol of the port; and providing a per protocol, per port capacity minimum increment value and a per protocol, per port base capacity minimum increment value, said provided values being specific to a given protocol on a given port of a given adapter; said specific values are determined by said adapter driver, and communicated to a hardware management console (HMC) for customer usage.

2. The method as recited in claim 1, wherein the input/output (I/O) adapter includes a Single Root Input/Output Virtualization (SRIOV) adapter.

3. The method as recited in claim 1, wherein configuring a virtual function (VF) using a capacity value of a port includes a system administrator supplying the capacity value for the port using a hardware management console (HMC); said capacity value indicating a level of adapter resources.

4. The method as recited in claim 1, includes providing a user interface enabling a configuration of the VFs on the port.

5. The method as recited in claim 4, wherein said user interface is adapted for use for multiple different adapters, and includes said user interface providing VF limits and default values for each protocol of the port to the user.

6. The method as recited in claim 5, further includes receiving a user selected number of VFs for each protocol for each port, said adapter driver checking the received user selected number of VFs for each protocol for each port being within provided VF limits.

7. The method as recited in claim 6, includes said adapter driver identifying an illegal configuration responsive to the received user selected number of VFs for each protocol for each port not being within provided VF limits.

8. The method as recited in claim 6, includes a system hypervisor creating system and adapter resource pools responsive to the received user selected number of VFs for each protocol for each port being within provided VF limits.

9. The method as recited in claim 1, wherein said capacity minimum increment value communicates relative adapter resource and port bandwidth usage between VFs of different protocols sharing the same physical port.

10. The method as recited in claim 1, includes enabling said adapter driver to perform block allocation of adapter resources.

11. A system for implementing capacity and user-based resource allocation for an input/output (I/O) adapter in a virtualized computer system comprising:

a processor;
a hypervisor uses an adapter driver managing functions associated with the hardware I/O adapter;
said processor using said hypervisor to perform the steps of:
configuring a virtual function (VF) using a capacity value of a port; said capacity value representing a percentage of the available performance of the port;
providing an adapter driver for configuring multiple adapter parameters to provide the available performance for the port; and
enabling a user to specify a level of performance assigned to each protocol of the port; and
providing a per protocol, per port capacity minimum increment value and a per protocol, per port base capacity minimum increment value, said provided values being specific to a given protocol on a given port of a given adapter; said specific values are determined by said adapter driver, and communicated to a hardware management console (HMC) for customer usage.

12. The system as recited in claim 11, wherein the input/output (I/O) adapter includes a Single Root Input/Output Virtualization (SRIOV) adapter.

13. The system as recited in claim 11, wherein configuring a virtual function (VF) using a capacity value of a port includes a system administrator supplying the capacity value for the port using a hardware management console (HMC); said capacity value indicating a level of adapter resources.

14. The system as recited in claim 11, includes providing a user interface enabling a configuration of the VFs on the port.

15. The system as recited in claim 14, wherein said user interface is adapted for use for multiple different adapters, and includes said user interface providing VF limits and default values for each protocol of the port to the user.

16. The system as recited in claim 15, further includes receiving a user selected number of VFs for each protocol for each port, said adapter driver checking the received user selected number of VFs for each protocol for each port being within provided VF limits.

17. The system as recited in claim 16, includes said hypervisor creating system and adapter resource pools responsive to the received user selected number of VFs for each protocol for each port being within provided VF limits.

* * * * *